United States Patent

[11] 3,593,043

[72] Inventor David R. Shuey
Webster, N.Y.
[21] Appl. No. 795,787
[22] Filed Feb. 3, 1969
[45] Patented July 13, 1971
[73] Assignee Xerox Corporation
Rochester, N.Y.

[54] PULSE SHAPING CIRCUIT
6 Claims, 6 Drawing Figs.

[52] U.S. Cl. 307/265, 307/252 F, 307/274, 307/301
[51] Int. Cl. H03k 1/18
[50] Field of Search 307/265, 301, 278, 274

[56] References Cited
UNITED STATES PATENTS

| | | | |
|---|---|---|---|
| 2,968,770 | 1/1961 | Sylvan | 307/301 X |
| 3,296,556 | 1/1967 | Schaefer | 307/265 X |
| 3,487,236 | 12/1969 | Graf | 307/301 X |

*Primary Examiner*—Donald D. Forrer
*Assistant Examiner*—John Zazworsky
*Attorneys*—Paul M. Enlow, Ronald Zibelli, James J. Ralabate, Norman E. Schrader and Irving Keschner

ABSTRACT: In a facsimile transceiver, apparatus for shaping the drum position output pulses generated by photoreceptors at the transmitter and receiver. The shaping apparatus provides pulses of precise time duration, the duration being one of two discrete times dependent upon whether the transceiver is in the transmitting or receiving mode.

INVENTOR.
DAVID R. SHUEY
BY Irving Keschner
AGENT

PULSE SHAPING CIRCUIT

BACKGROUND OF THE INVENTION

A transceiver is a facsimile device capable of either transmitting or receiving video information over a transmission medium. The transceiver utilizes scan and print transducers, or heads, to scan and reproduce graphic information. The transceiver, when performing as a transmitter, optically scans graphic information on a document, converting information from optical to electrical form. The electrical video information is transmitted over a suitable transmission medium to a receiver. The electrical video signal is applied to the receiving print head which reproduces the graphic information on a copy sheet. The receiver reproduces the information on the copy sheet generally in the same location that it is located on the document in the transmitter. To accomplish this, the scan head in the transmitter and the print head in the receiver must begin scanning the document and the copy sheet at substantially the same instant in time. That is, the scan head in the transmitter and the print head in the receiver need be aligned to a predetermined angular relationship (be in phase) prior to the transmission of the video information. The prior art utilized various techniques for correcting receiver and transmitter misalignment. Generally, the transceiver is constructed so that a pulse is generated indicative of the angular position of the scan and print transducers. The pulses are compared for identity. If there is no identity corresponding to misalignment, an error signal is generated and coupled to appropriate control circuitry to bring the scan and print transducers into alignment.

It is essential that the pulses representing the angular positions of the scan and print transducers be highly reliable and precise in duration and have a large degree of noise immunity in order for accurate alignment, the prior art devices being less than desirable in this respect. In addition, since the pulse representing the scan transducer position is transmitted to the receiver with a delay inherent in the transmission thereto, it is advantageous for the transceiver to be capable of providing pulses having two discrete times dependent on the mode of operation.

SUMMARY OF THE INVENTION

The present invention provides pulse shaping apparatus which produces stable and reliable pulses having a large degree of noise immunity and which is particularly useful in facsimile transceiver systems.

In particular, the invention includes an initially charged capacitor coupled across an initially conducting unijunction transistor. When a pulse representing the angular position of the rotating drum is generated, the capacitor begins to charge to a higher potential and the unijunction transistor becomes nonconducting. When the capacitor attains a predetermined potential, corresponding to the conduction level of the unijunction transistor, the unijunction transistor is caused to conduct, thereby generating the shaped pulse. The invention also includes means for generating the pulse having one of two discrete time durations dependent on the mode of transceiver operation.

It is therefore an object of the present invention to provide an inexpensive, simple, reliable, and accurate pulse shaping circuit.

It is a further object of the invention to provide a pulse shaping circuit largely immune to noise.

It is still a further object of the present invention to provide an inexpensive and compact pulse shaping circuit for providing pulses having a precise time duration, the duration being one of two discrete times dependent upon the mode of operation of the circuit.

It is a further object of this invention to provide a pulse shaping apparatus which includes a unijunction transistor in which the conduction voltage and other characteristics of the unijunction can be programmed by the selective adjustment of a variable resistance coupled thereto.

It is still a further object of the invention to provide a novel pulse shaping circuit for use in a facsimile transceiver system.

BRIEF DESCRIPTION OF THE DRAWINGS

For a better understanding of the invention as well as other objects and further features thereof, reference is made to the following description which is to be read in conjunction with the accompanying drawings and wherein.

DESCRIPTION OF THE PREFERRED EMBODIMENT

Figure 1:
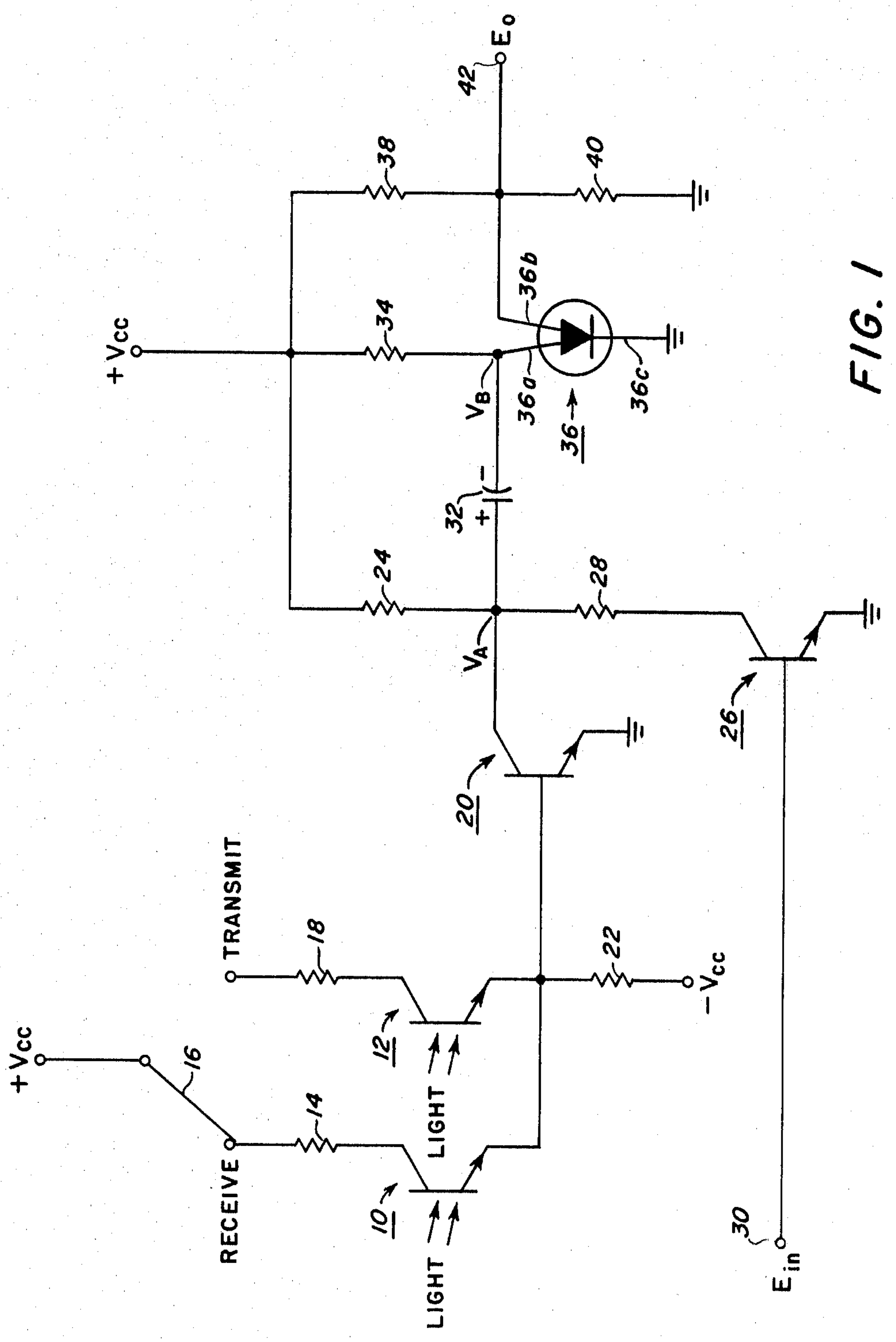
FIG. 1 is a schematic diagram of the novel circuit of the present invention, and FIGS. 2(*a*)—2(*e*) illustrate the waveforms appearing at various points of the circuit shown in FIG. 1.
Figure 2A:
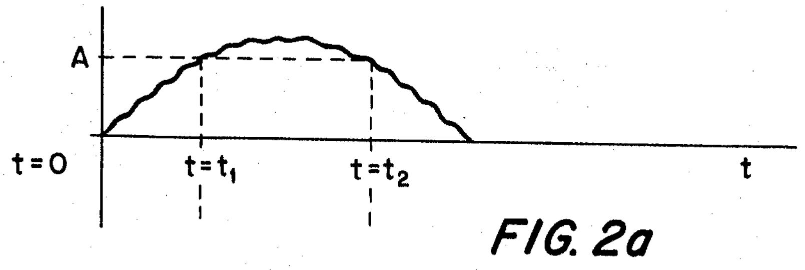
Figure 2B:
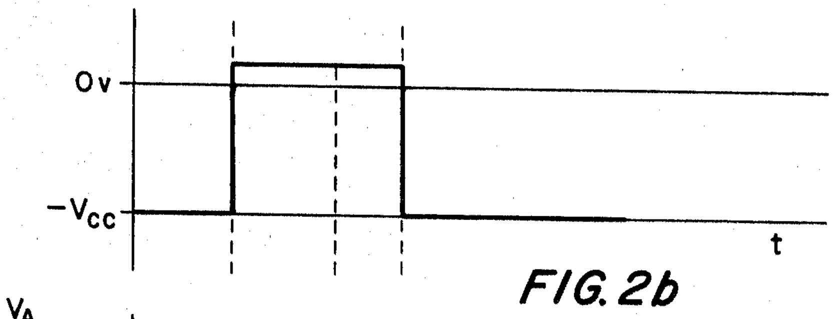
Figure 2C:
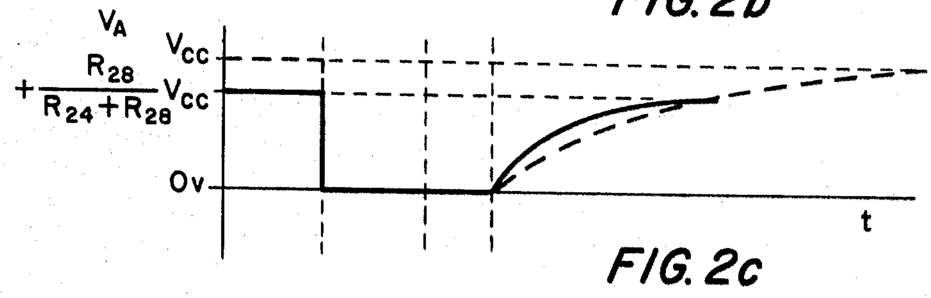
Figure 2D:
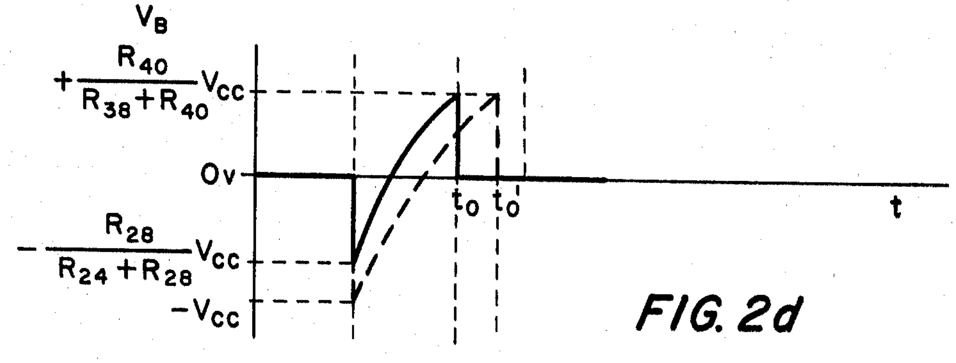
Figure 2E:
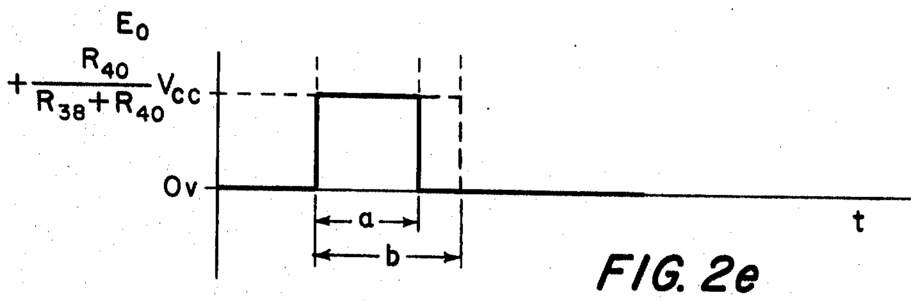

Referring now to FIG. 1, there is shown a schematic diagram of the novel pulse shaping circuitry of the present invention. The preferred use of the pulse shaping circuit herein described is in a facsimile transceiver although the circuit may be utilized in various other systems requiring shaped pulses.

The signal to be shaped originates from one of two phototransistors 10 and 12 dependent upon the transceiver mode of operation, i.e. whether information is being transmitted or received. The base junction of phototransistors 10 and 12 are illuminated for a short time duration once for every scanning and printing drum rotation. The generation of the drum position pulses may be accomplished other than by the use of phototransistors, such as with magnetic switches, cams, etc. The collector of phototransistor 10 is coupled to source of potential $V_{cc}$ via resistor 14 and switch 16 when the transceiver is in the receive mode. The collector of phototransistor 12 is coupled to source of potential $V_{cc}$ via resistor 18 and switch 16 when the transceiver is in the transmit mode. The emitters of transistor 10 and 12 are connected together and to the base of transistor 20. Transistor 20 is initially nonconducting due to the bias applied to its base electrode via voltage source $-V_{cc}$ and resistor 22. The collector of transistor 20 is coupled to bias potential $V_{cc}$ via resistor 24 and coupled to the collector of transistor 26 via resistor 28. A source of input voltage, $E_{in}$, is applied to the base of transistor 26 via terminal 30. One terminal of capacitor 32 is connected to the collector of transistor 20, the other terminal thereof being coupled to source of bias potential $V_{cc}$ via resistor 34. A unijunction transistor 36, having terminals 36*a*, 36*b*, and 36*c* is connected to capacitor 32 as shown. A voltage divider network, comprising resistors 38 and 40, is coupled across terminal 36*b* of unijunction transistor 36. Either resistor 38 or 40, or both, may be variable, to vary the conduction level of unijunction transistor 36. The circuit output, $E_o$, is taken at terminal 42.

In operation, assuming that the transceiver is in the receive mode, switch 16 is positioned to energize phototransistor 10 by coupling a bias potential $V_{cc}$ to the collector via resistor 14. Phototransistor 12 is open circuited in the receive mode. Although not indicated in FIG. 1, the polarity of the voltage $E_{in}$ applied to terminal 30 is dependent upon the position of switch 16. When switch 16 is in the receive mode, $E_{in}$ is positive and of a magnitude to saturate transistor 26. Initially, when the base junction of phototransistor 10 is not illuminated, the base of transistor 20 is biased negatively by negative source of potential $V_{cc}$ and resistor 22, thereby turning off transistor 20. The initial voltage $V_A$ appearing at the collector of transistor 20 is determined by the voltage divider network comprising resistors 24 and 28. The voltage $V_B$ initially appearing at the junction of resistor 34 and terminal 36*a* of unijunction transistor 36 is approximately zero since unijunction transistor 36 is initially forward biased by $V_{cc}$ and resistor 34. The output voltage Eo, since the unijunction transistor 36 is conducting, is initially zero. Capacitor 32 is initially charged to a voltage equal to $V_A - V_B$ with the polarity as shown in FIG. 1.

When the base of phototransistor 10 is illuminated, for example, when the recording drum at the receiver attains a predetermined angular position once every drum rotation, a positive pulse appears at the emitter electrode of phototransistor 10 which is coupled directly to the base of transistor 20. The magnitude of the positive pulse generated by phototransistor 10 is sufficient to drive transistor 20 to saturation. Since transistor 20 is in saturation, $V_A$ is driven approximately to zero volts. Due to the initial polarity across capacitor 32 and by virtue of the fact that the voltage across capacitor 32 cannot change instantaneously, $V_B$ goes negative, thereby turning off unijunction transistor 36. Thereupon, Eo goes to a voltage determined by the voltage divider network comprising resistors 38 and 40. Capacitor 32 charges towards $+V_{cc}$ through resistor 34 and through the collector-emitter junctions of transistor 20. As capacitor 32 starts to charge towards $+V_{cc}$, $V_B$ also increases towards $V_{cc}$. When voltage $V_B$ increases to a value equal to the conduction level of unijunction transistor 36 as determined by the voltage divider network comprising resistors 38 and 40, unijunction transistor 36 is turned on and remains so until the completion of the pulse shaping cycle. When phototransistor 10 is no longer illuminated, the voltage at the emitter thereof returns to the initially $V_{cc}$ level and transistor 20 is returned to its initially nonconducting state. Capacitor 32 is charged to a voltage determined by the voltage divider network comprising resistors 24 and 28 as described hereinabove. At this time, the circuit is in its initial state and is ready for the next shaping cycle to be initiated.

The operation of the circuit in the transmitting mode is virtually the same as that described hereinabove except that switch 16 now couples the collector of phototransistor 12 to bias voltage $V_{cc}$ via resistor 18 while phototransistor 10 is open circuited. In the transmit mode, the voltage $E_{IN}$ is negative in polarity, thereby causing transistor 26 to be nonconducting. The voltage $V_A$ appearing at the junction of resistors 24 and 28 is initially equal to the supply voltage $V_{cc}$.

Since the voltage necessary to cause unijunction transistor 36 to conduct is the same in both the receive and transmit modes, a longer time duration is required for causing unijunction transistor 36 to revert to its conducting state by virtue of the increased initial charge on capacitor 32. The pulse output appearing at terminal 42 therefore has a longer time duration in the transmit mode than in the receive mode.

The circuit operation is best described with reference to FIGS. 2(*a*)—2(*e*). FIG. 2(*a*) illustrates a typical pulse output from the phototransistors. The rippling shown on a curve is enlarged to show the effect of noise on the phototransistor output pulse. At this point, it can be seen why the circuit has been described as a "pulse shaper." Since the pulse is utilized to synchronize the rotating drums on the transmitting and receiving machine, accurate pulses having a high degree of noise immunity is required. The output pulse from the phototransistors therefore must be modified or "shaped" to be used successfully on the transceiver. It should be noted that the waveforms shown are merely illustrative. For example, the instantaneous change from one voltage level to another is an ideal representation of the actual pulse output. Transistor 20 is so biased so that when the electrical output from the phototransistor reaches a magnitude A at time $t=t_1$ as shown in FIG 2 (*a*), the voltage appearing at the base of transistor 20 is driven from $-V_{cc}$ to a positive voltage as shown in FIG. 2 (*b*). The current into the base of transistor 20 is now sufficient to cause transistor 20 to saturate and, as shown in FIG. 2 (*c*), voltage $V_A$ changes from a positive voltage, proportional to $V_{cc}$, to zero volts when the circuit is in the receive mode. This negative voltage step appears across unijunction transistor 36, $V_B$ changing by a negative pulse step equal to the step appearing at $V_A$ as shown in FIG. 2(*d*). The negative step $V_B$ is sufficient to drive unijunction transistor 36 to the nonconducting state and a positive step pulse appears at output terminal 42, as shown in FIG. 2 (*e*). As stated hereinabove, capacitor 32 at a time $t_1$, starts charging exponentially to $V_{cc}$ through resistor 34, $V_B$ also increasing exponentially as shown in FIG. 2 (*d*). When the potential across capacitor 32 attains a value equal to the conduction voltage of unijunction transistor 36 at $t=to$, the unijunction transistor is driven to conduction and a negative pulse step is generated, as shown in FIG. 2 (*e*). Therefore, a sharply defined pulse of a duration of "*a*" units of time is produced at the output terminal 42. Dependent upon the values of the circuit elements utilized, the time units may be in seconds, milliseconds, microseconds, etc. When the output generated by the photoreceptor falls below that necessary to maintain transistor 20 in conduction, at time $t=t_2$, the voltage at the collector of transistor 20, $V_A$, rises exponentially towards its initial value, as shown in FIG. 2 (*c*). The circuit now is in its initial state.

When the transceiver is in the transmit mode, an output pulse of different time duration is generated, as illustrated by the dashed waveforms in FIGS. 2(*c*)—2(*e*). The initial potential appearing at the collector of transistor 20, with resistor 28 out of the circuit due to the nonconduction of transistor 26, is equal to $+V_{cc}$. Therefore, when transistor 20 is driven to saturation by light incident upon the base junction of phototransistor 12, a negative step pulse of magnitude $V_{cc}$ appears across unijunction transistor 36, as shown in FIG. 2(*d*). Capacitor 32 charges towards $+V_{cc}$ through resistor 34 at the same rate as in the receive mode. $V_B$ similarly increased at the same rate as capacitor 32, as described in the receive mode. Since $V_B$ is initially at a more negative value than when in the receive mode, a longer time duration is required to attain the conduction voltage level of unijunction transistor 36, as determined by the voltage divider network comprising resistors 38 and 40. When $V_B$ reaches the conduction voltage at $t=to'$ the unijunction transistor 36 is driven to conduction and a pulse of duration of "*b*" time units is produced at output terminal 42, as shown in FIG. 2(*e*).

The unijunction transistor 36 and resistors 38 and 40 can be replaced by a commercially available unit such as a Programmable Unijunction Transistor (PUT) available from the General Electric Company. The PUT provides a unijunction transistor whose conduction point and other characteristics may be accurately selected or programmed, to fit the requirements of the present circuit and the characteristics have been found to be relatively constant from one unit to another.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example, the circuit can be utilized in systems other than transceivers where it is desired to provide a simple apparatus for providing a pulse of precise time duration, the duration being one of two discrete times dependent upon the polarity of a control signal.

What I claim is:

1. A pulse shaping circuit comprising:
means for generating an electrical pulse,
a capacitor coupled to said pulse generating means,
said capacitor initially being charged to a predetermined voltage,
means coupled to said capacitor for controlling the magnitude of the initial voltage thereon, and
an initially conducting unijunction transistor coupled to said capacitor, said electrical pulse causing said unijunction transistor to become nonconducting and said capacitor to start charging towards a voltage greater than said initial voltage, said unijunction transistor conducting when the voltage on said capacitor attains the conduction level thereof, the output of said unijunction transistor comprising a pulse whose duration is dependent upon the magnitude of the initial voltage on said capacitor.

2. A pulse shaping circuit comprising:
first means for generating an electrical pulse,
second means for generating an electrical pulse, the output of said first and second pulse generating means being coupled to a common point,
switch means for selectively energizing said first or second pulse generating means, a capacitor coupled to said common point, said capacitor initially being charged to a predetermined voltage, means coupled to said capacitor for controlling the magnitude of the initial voltage thereon, the output of said controlling means being dependent on whether said first or second generating means is energized, and an initially conducting unijunction transistor coupled to said capacitor, the electrical pulse at said common point causing said unijunction transistor to become nonconducting and said capacitor to start charging towards a voltage greater than said initial voltage, said unijunction transistor conducting when the voltage across said capacitor attains the conduction level thereof, the output of said unijunction transistor comprising a pulse whose duration is dependent upon whether said first or second pulse generating means has been energized.

3. The circuit as defined in claim 2 wherein said control means comprises a first transistor, said transistor conducting when said first generating means is energized and wherein said first transistor is nonconducting when said second generating means is energized.

4. The circuit as defined in claim 3 including an initially nonconducting second transistor coupled between said first and second pulse generating means and said capacitor, said second transistor being driven to conduction when said pulse is generated by either of said first or second pulse generating means.

5. The circuit as defined in claim 4 including means connected to said unijunction transistor to vary the conduction level thereof.

6. The circuit as defined in claim 5 wherein said first and second pulse generating means are responsive to light incident thereon, the output of said first and second pulse generating means comprising an electrical pulse having a magnitude proportional to the intensity of said incident light.